(12) United States Patent
Konno et al.

(10) Patent No.: US 9,050,821 B2
(45) Date of Patent: Jun. 9, 2015

(54) INK JET PRINTING APPARATUS AND METHOD

(75) Inventors: Yuji Konno, Kawasaki (JP); Yoshiaki Murayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 718 days.

(21) Appl. No.: 12/958,805

(22) Filed: Dec. 2, 2010

(65) Prior Publication Data

US 2011/0134177 A1    Jun. 9, 2011

(30) Foreign Application Priority Data

Dec. 9, 2009   (JP) ................................ 2009-279576

(51) Int. Cl.
*B41J 2/15* (2006.01)
*B41J 2/145* (2006.01)
*B41J 2/21* (2006.01)
*G06K 15/10* (2006.01)

(52) U.S. Cl.
CPC .............. *B41J 2/2125* (2013.01); *B41J 2/2132* (2013.01); *G06K 15/107* (2013.01)

(58) Field of Classification Search
USPC .......................................................... 347/41
See application file for complete search history.

(56) References Cited

U.S. PATENT DOCUMENTS

| | | | |
|---|---|---|---|
| 5,818,474 A | 10/1998 | Takahashi et al. | |
| 6,779,873 B2 | 8/2004 | Maeda et al. | |
| 6,874,864 B1 | 4/2005 | Maeda et al. | |
| 7,303,247 B2* | 12/2007 | Maru et al. | 347/15 |
| 7,393,078 B2 | 7/2008 | Yazawa et al. | |
| 7,735,949 B2 | 6/2010 | Takahashi et al. | |
| 7,878,613 B2 | 2/2011 | Nishikori et al. | |
| 2006/0044338 A1 | 3/2006 | Maru et al. | |
| 2009/0046124 A1 | 2/2009 | Edamura et al. | |
| 2010/0207985 A1 | 8/2010 | Takahashi et al. | |

FOREIGN PATENT DOCUMENTS

| | | |
|---|---|---|
| JP | 04-028547 A | 1/1992 |
| JP | 7-52390 A | 2/1995 |
| JP | 2006-062332 A | 3/2006 |
| JP | 2007129652 A | 5/2007 |
| JP | 2009-279576 A | 12/2009 |

OTHER PUBLICATIONS

Paul G. Roetling, "Visual Performance and Image Coding", Image Processing, SPIE/OSA, vol. 74, pp. 195-199 (1976).

* cited by examiner

*Primary Examiner* — Uyen Chau N Le
*Assistant Examiner* — Chad Smith
(74) *Attorney, Agent, or Firm* — Fitzpatrick, Cella, Harper & Scinto

(57) ABSTRACT

Through the use of a mask with an appropriate pattern, depending on dot size or density, in an in jet printing apparatus, image defects caused by conveyance distance errors are suppressed. More concretely, at the masking unit A an interlaced mask pattern is used and a masking process is performed with respect to 2 pl dot data obtained from the dot pattern development unit 604. On the other hand, at the masking unit B a random mask pattern is used and masking is performed with respect to 5 pl dot data. Herewith it has become possible, at all gradations, to suppress the 2 image defects, density unevenness and graininess, caused by conveyance distance errors.

7 Claims, 20 Drawing Sheets

BINARY IMAGE
×

MASK PATTERN (RANDOM)
=

SCAN IMAGE (MANY LOW FREQUENCY COMPONENTS)

BINARY IMAGE
×

MASK PATTEN (INTERLACED)
=

SCAN IMAGE (FEW LOW FREQUENCY COMPONENTS)

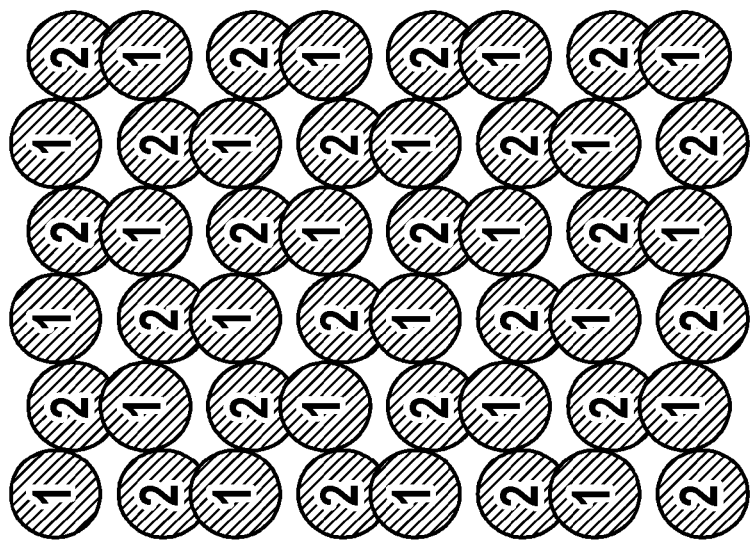
FIG.2A
PAPER CONVEYANCE DIRECTION
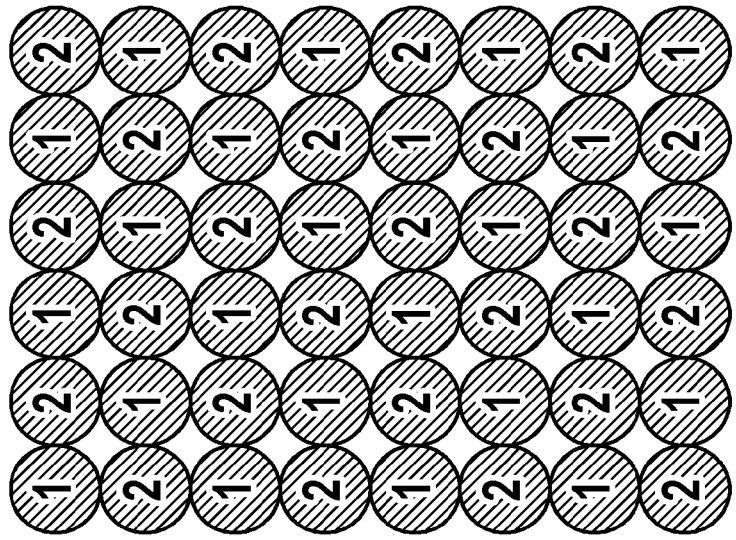
FIG.2B
PAPER CONVEYANCE DIRECTION

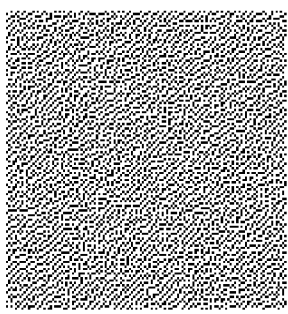 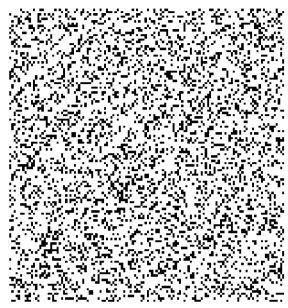 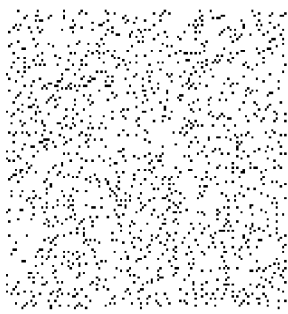
FIG.13A   BINARY IMAGE × MASK PATTERN (RANDOM) = SCAN IMAGE (MANY LOW FREQUENCY COMPONENTS)
 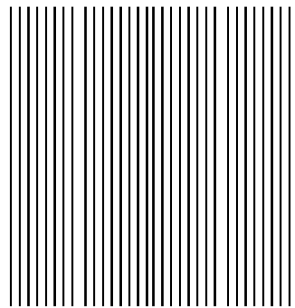 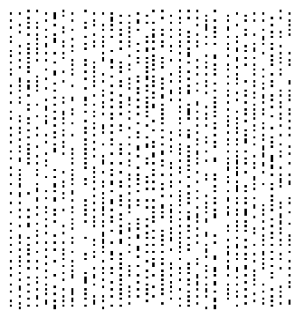
FIG.13B   BINARY IMAGE × MASK PATTEN (INTERLACED) = SCAN IMAGE (FEW LOW FREQUENCY COMPONENTS)

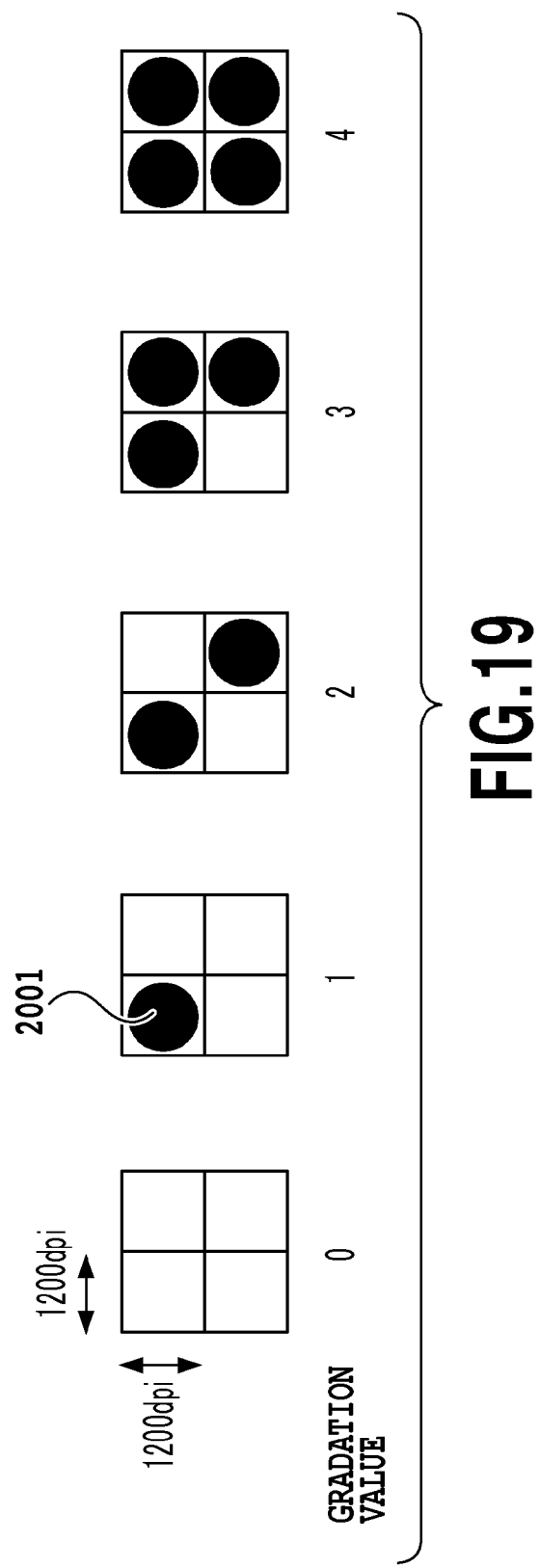

INK JET PRINTING APPARATUS AND METHOD

BACKGROUND OF THE INVENTION

1. Field of the Invention

The present invention relates to ink jet printing apparatuses and methods, and in particular to configurations for reducing image defects caused by errors in the conveyed distance of a print medium such as printing paper.

2. Description of the Related Art

It is known that in ink jet printing apparatuses black and white stripe-like density unevenness occurs in printed images, caused by errors in the conveyed distance. The conveyance mechanisms of ink jet printing apparatuses are generally composed of parts such as conveyance rollers, pinch rollers, sheet discharge rollers and spurs. These parts have variation in their dimensions. The dimensional variation of each of the parts of this kind of conveyance mechanism causes a decline in precision in conveying the print medium, and causes the occurrence of the above mentioned error in the conveyed distance. In addition to the above mentioned decline in precision in conveying the print medium, it is also thought that flicking of the printing paper, that is, the existence of a kicking phenomenon when the tail end of the printing paper breaks free from the nip of the paper feed and pinch rollers, is also a cause of conveyance distance errors.

FIG. 1 is a diagram that schematically illustrates the density unevenness that occurs due to conveyance distance error, caused by the above mentioned kicking phenomenon. In FIG. 1, 301 denotes a white stripe-like density unevenness, which is a belt shaped region of a fixed width and low density, caused by kicking. Kicking is caused not only by the mechanical elements of the printing apparatus, but also by a variety of factors such as the unevenness among different types of print media and differences between print medium lots. As a result there is unevenness in whether kicking occurs or does not occur, and in the cases where kicking occurs there is also an unevenness in the distance of the conveyance error. Accordingly, in general, it is very difficult to devise countermeasures by way of controlling conveyance, such as by taking into account such positional shifts in advance and correcting the conveyance at the location where the kicking occurs, according to each of the various factors.

FIGS. 2A and 2B are diagrams that explain the image defects when the above mentioned kicking occurs. The printing example shown in these figures illustrates a case of so-called multi-pass printing wherein print data is allocated (partitioned) into multiple scans and printing is performed by carrying out multiple scans of the print head at the same image area (in the present example 2 pass printing is carried out by partitioning the data into 2 scans). In FIGS. 2A and 2B the numbers written on each dot indicate which pass of the 2 pass printing by which the dot is printed. More particularly, in the examples illustrated in FIGS. 2A and 2B dots arranged in a staggered pattern are printed in the first pass and in the second pass dots are printed at locations that fill the gaps of the dots arranged in the staggered pattern of the first pass.

FIG. 2A schematically illustrates the case where the dots are ideally arranged, that is, where there is no kicking and as a result there are no conveyance distance errors. In contrast, FIG. 2B illustrates a dot pattern for the case where kicking occurs at the print medium conveyance between the first pass and the second pass and because of this there is a conveyance distance error, in the direction of conveyance. As shown in FIG. 2B the dots of the second pass are printed at locations that are shifted, in the print medium conveyance direction, from the standard position of second pass dots in relation to first pass dots. As a result, the coverage of the surface of the print medium by dots is decreased in comparison to the example illustrated in FIG. 2A. Because of the decrease in coverage at the macroscopic level there is a decrease in density, at the area where printing is completed by the first pass and second pass, and a white stripe-like density unevenness 301 occurs as shown in FIG. 1. This type of density unevenness occurs not only as the result of comparatively large conveyance distance errors such as from kicking but also as the result of comparatively small conveyance distance errors resulting from imprecision in the conveyance mechanism as mentioned above.

It is possible to reduce the above described density unevenness, caused by dot position shifts in the conveyance direction of the print medium, by devising a mask pattern for use in multi-pass print data partitioning.

As for the staggered pattern and the complementary pattern that fills the gaps of the staggered pattern, illustrated in FIGS. 2A and 2B, because the arrangement of mask pixels that permit printing are ordered or periodic patterns, the area factor easily varies in relation to conveyance distance errors such as kicking. In contrast, as shown in FIG. 3, because the mask pixels that authorize printing (the pixels that are shown in black in FIG. 3 are hereafter also referred to as "print permitted pixels") are arranged randomly, as in the case of a so-called random mask pattern, a coverage decrease caused by a conveyance distance error is unlikely to occur. FIGS. 4A and 4B are diagrams that explain this and are similar to FIGS. 2A and 2B. FIG. 4A illustrates a printing state with no errors in the distance conveyed, in the case where a random mask pattern such as that of FIG. 3 is used and partitioning of print data into first and second passes is performed. As can also be understood from this figure the arrangement of each of the dots printed in the first pass and the second pass and the arrangement of the first pass and the second pass with respect to each other are random. In contrast FIG. 4B schematically illustrates a printing state where a conveyance distance error such as kicking has occurred. As can be understood by comparing FIGS. 2B and 4B, the decrease in coverage, due to conveyance distance error, is smaller in the example illustrated in FIG. 4B. The reason for this is because, as compared to the case of a staggered pattern mask, where print permitted pixels in the pattern of the same pass are not arranged consecutively in the direction of conveyance, in the case of a random mask portions are included where print permitted pixels of the pattern of the same pass are arranged consecutively. That is, in the case where in the same pass dots are printed having a consecutive arrangement in the direction of conveyance, even if there is the occurrence of a print position shift in the conveyance direction between passes, because consecutively arranged dots are shifted together the area where other portions of the print medium are visible as a result of the shift is decreased. In other words, by making use of a random mask pattern the decrease in dot coverage rate caused by errors in the distance conveyed is decreased.

It should be noted that, taking X as the direction of print head scanning and Y as the direction of print medium conveyance, because the conveyance distance error is a shift in the Y direction, the influence of conveyance distance error is decreased as mask pattern dot arrangement continuity is provided in the Y direction. However, if continuity is provided only in the Y direction influence of variation in the X direction (for example, a print location shift caused by a dot print position shift in the forward or return direction of a bi-directional print, or caused by a change in the carriage velocity) is increased. For this reason it is preferable to make use of a mask pattern that has a white noise characteristic without a peak spatial frequency characteristic in a specific direction.

The use of a random mask in connection with multi-pass print data partitioning is disclosed in Japanese Patent Laid-Open No. H07-052390 (1995). As above, a mask pattern, such as a random mask pattern wherein the arrangement of the dots printed thereby includes a comparatively large number of low frequency components, is preferably used in the reduction of density unevenness, such as stripes, caused by a print position shift in the direction of conveyance.

However, although mask patterns such as those above, wherein the number of low frequency components of the dot arrangement is comparatively large, are effective against print position shifts, in the conveyance direction, that occur between passes, uneven distribution of overlapping dots caused by a print position shift occurs easily and macroscopically these overlapping dots cause image graininess. That is, orderly mask patterns such as the staggered mask pattern mentioned above do not, because of a print position shift, produce dot overlap having an ordered arrangement or cause image graininess. In contrast to this, in randomized patterns, wherein the dot arrangement has a large number of low frequency components, the arrangement of overlapping dots, due to a print position shifts between passes, is unevenly distributed. In other words, the dot overlap is not satisfactorily dispersed. Accordingly, these unevenly distributed overlapping dots bring about graininess in the printed image.

FIG. 5 is a diagram that explains this aspect. 501 to 504 of FIG. 5 illustrate the changing position of the print head relative to the printing paper, while the printing paper is conveyed by the conveying unit. The same figure also illustrates an example of 2 pass printing where printing is carried out via 2 scans over the same fixed print region. Furthermore, FIG. 5 illustrates an example where kicking occurs in the conveyance of the pass interval when moving from print head position 502 to print head position 503 and where in the other pass intervals there are no distance errors in conveying the printing paper. When there is the occurrence of a conveyance distance error, such as kicking, in conveying the print medium from print head position 502 to print head position 503 a decrease in image quality such as that of printed image 508 occurs. In greater detail, because printing of the image region denoted by the arrow 505 is carried out when the print head is at positions 501 and 502 there is no influence of kicking and a decrease in image quality does not occur. Because printing of the image region denoted by the arrow 506 is carried out when the print head is at positions 502 and 503 the influence of the kicking that occurs at the conveyance of the printing paper to position 503 is felt and image graininess worsens. Furthermore, as printing of the image region denoted by the arrow 507 is carried out when the print head is at positions 503 and 504, printing is carried out after the occurrence of the kicking, and because there is no occurrence of a conveyance distance error in the conveyance between position 503 and position 504 worsening of the above mentioned graininess does not occur. In this manner when viewing the entire image 508, graininess differs only in region 506, and image quality is decreased.

As described above, the manner in which conveyance distance errors exert influence differs according to the mask pattern that is used and there is a problem wherein the deterioration of image quality become remarkable in the case where a non-suitable mask pattern is used. Also, it has been known that the above mentioned graininess becomes more perceptible to the human eye as the volume of the ink drops ejected from the print head increase, that is, as the size of the dots printed by the ink drops increases. Furthermore, it is also known that density of the formed dots increases as the color density of the ink dyes, etc. increases, and in the same manner the graininess is more easily perceived.

SUMMARY OF THE INVENTION

An object of the present invention, from the above viewpoint, is to present an ink jet printing apparatus and method that enables the suppression of image defects due to conveyance distance errors by way of employing suitable mask patterns in accordance with dot size and density.

In a first aspect of the present invention, there is provided an ink jet printing apparatus, which uses a print head provided with ejection ports that eject ink capable of forming dots of a first size on a print medium and ejection ports that eject ink capable of forming dots of a second size, larger than the first size, on the print medium, and performs printing by ejecting ink onto the print medium based on print data, comprising: a multi-pass printing unit that completes the printing of a predetermined region by a plurality of scans of the print head in relation to the print medium; and a masking unit for generating thinned print data for each of the plurality of scans by masking the print data of the predetermined region using a mask, wherein the masking unit performs masking of the print data for forming the dots of the first size using a first mask pattern and performs masking of the print data for forming the dots of the second size using a second mask pattern in which the arrangement pattern of print permitted pixels has a lower number of low frequency components than that of the first mask pattern.

In a second aspect of the present invention, there is provided an ink jet printing apparatus, which uses a print head provided with ejection ports that eject ink capable of forming dots of a first density on a print medium and ejection ports that eject ink capable of forming same-colored dots of a second density, higher than the first density, on the print medium, and performs printing by ejecting ink onto the print medium based on print data, comprising: a multi-pass printing unit that executes the printing of a predetermined region by a plurality of scans of the print head in relation to the print medium; and a masking unit for generating thinned print data for each of the plurality of scans by masking the print data of the predetermined region using a mask, wherein the masking unit performs masking of the print data for forming the dots of the first density using a first mask pattern and performs masking of the print data for forming the dots of the second density using a second mask pattern in which the arrangement pattern of print permitted pixels has a lower number of low frequency components than that of the first mask pattern.

In a third aspect of the present invention, there is provided an ink jet printing apparatus that, during the scanning of a print head, which is capable of ejecting first ink drops and second ink drops of either a different ejection volume or a different color than the first ink drops, in relation to a print medium, performs printing by ejecting the first ink drops and the second ink drops onto the print medium from the print head, comprising: a data generation unit that, using a mask pattern on which print permitted pixels and non-print permitted pixels are arranged, generates, from image data to be printed at the same region of the print medium, image data to be printed at each of a plurality of scans of the print head; and a printing unit that performs printing at the same region based on image data generated by the data generation unit; wherein the print permitted pixels of the mask pattern for generating image data rendering the image to be printed by the first ink drops at the same region are arranged non-periodically, and the print permitted pixels of the mask pattern for generating image data rendering the image to be printed by the second ink drops at the same region are arranged periodically.

In a fourth aspect of the present invention, there is provided an ink jet printing method, in which a print head provided with ejection ports that eject ink capable of forming dots of a first size on a print medium and ejection ports that eject ink capable of forming dots of a second size, larger than the first size, on the print medium is used, for performing printing by ejecting ink onto the print medium based on print data, comprising: a step that provides a multi-pass printing unit to execute the printing of a predetermined region by a plurality of scans of the print head in relation to the print medium; and a masking step for generating thinned print data for each of the plurality of scans by masking the print data of the predetermined region using a mask, wherein the masking step performs masking of the print data for forming the dots of the first size using a first mask pattern and performs masking of the print data for forming the dots of the second size using a second mask pattern in which the arrangement pattern of print permitted pixels has a lower number of low frequency components than that of the first mask pattern.

In a fifth aspect of the present invention, there is provided an ink jet printing method, in which a print head provided with ejection ports that eject ink capable of forming dots of a first density on a print medium and ejection ports that eject ink capable of forming same-colored dots of a second density, higher than the first density, on the print medium is used, for performing printing by ejecting ink onto the print medium based on print data, comprising: a step that provides a multi-pass printing unit to execute the printing of a predetermined region by a plurality of scans of the print head in relation to the print medium; and a masking step for generating thinned print data for each of the plurality of scans by masking the print data of the predetermined region using a mask, wherein the masking step performs masking of the print data for forming the dots of the first density using a first mask pattern and performs masking of the print data for forming the dots of the second density using a second mask pattern in which the arrangement pattern of print permitted pixels has a lower number of low frequency components than that of the first mask pattern.

In a sixth aspect of the present invention, there is provided an ink jet printing method that, during a relative movement of a print head, which is capable of ejecting first ink drops and second ink drops of either a different ejection volume or a different color than the first ink drops, in relation to a print medium, performs printing by ejecting the first and second ink drops onto the print medium from the print head, comprising: a data generation step that, using a mask pattern on which print permitted pixels and non-print permitted pixels are arranged, generates, from image data to be printed at the same region of the print medium, image data to be printed at each of a plurality of relative movements of the print head; and a printing step that performs printing at the same region based on image data generated at the data generation step; wherein the print permitted pixels of the mask pattern for generating image data rendering the image to be printed by the first ink drops at the same region are arranged non-periodically, and the print permitted pixels of the mask pattern for generating image data rendering the image to be printed by the second ink drops at the same region are arranged periodically.

According to the above configuration it is possible to employ suitable mask patterns in accordance with dot size and density, and due to this it is possible to suppress image defects due to conveyance distance errors.

Further features of the present invention will become apparent from the following description of exemplary embodiments (with reference to the attached drawings).

BRIEF DESCRIPTION OF THE DRAWINGS

FIGS. 2A and 2B are diagrams that explain the image defects when the above mentioned kicking occurs;

FIGS. 13A and 13B are diagrams that explain the respective partitioning of print data using the mask patterns of FIGS. 11A and 11B, that is, they explain the print data (dot data) of a scanning unit that is obtainable from carrying out a print data thinning operation;

FIG. 19 is a diagram that explains the dot pattern development of the second embodiment.

DESCRIPTION OF THE EMBODIMENTS

Figure 1:
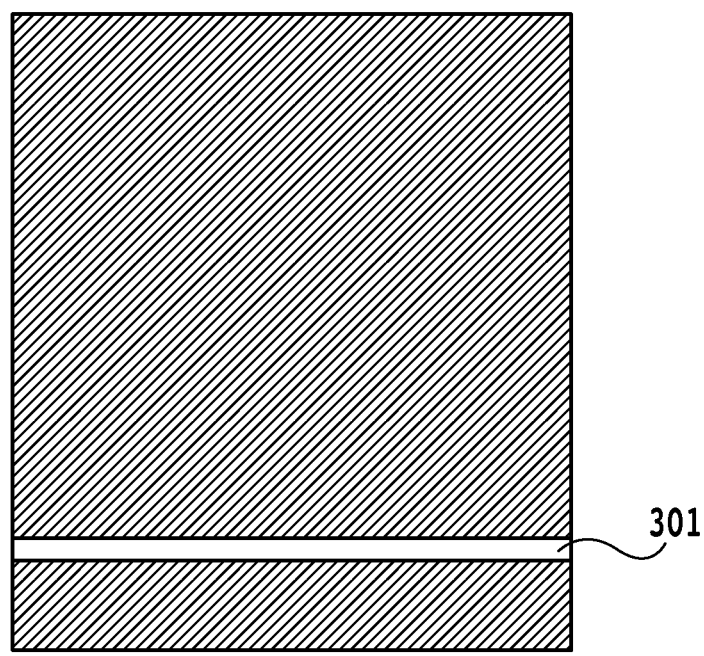
FIG. 1 is a diagram that schematically illustrates the density unevenness that occurs due to an error in the distance conveyed, caused by kicking.
Figure 3:
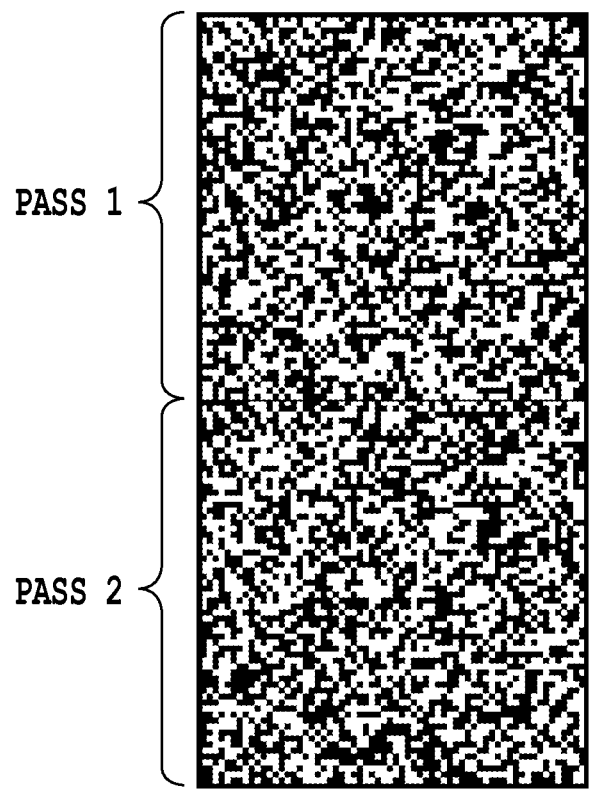
FIG. 3 is a diagram that illustrates an example of a random mask pattern.

Embodiments of present invention will be explained in detail below while referring to the drawings.

(First Embodiment)

Figure 6:
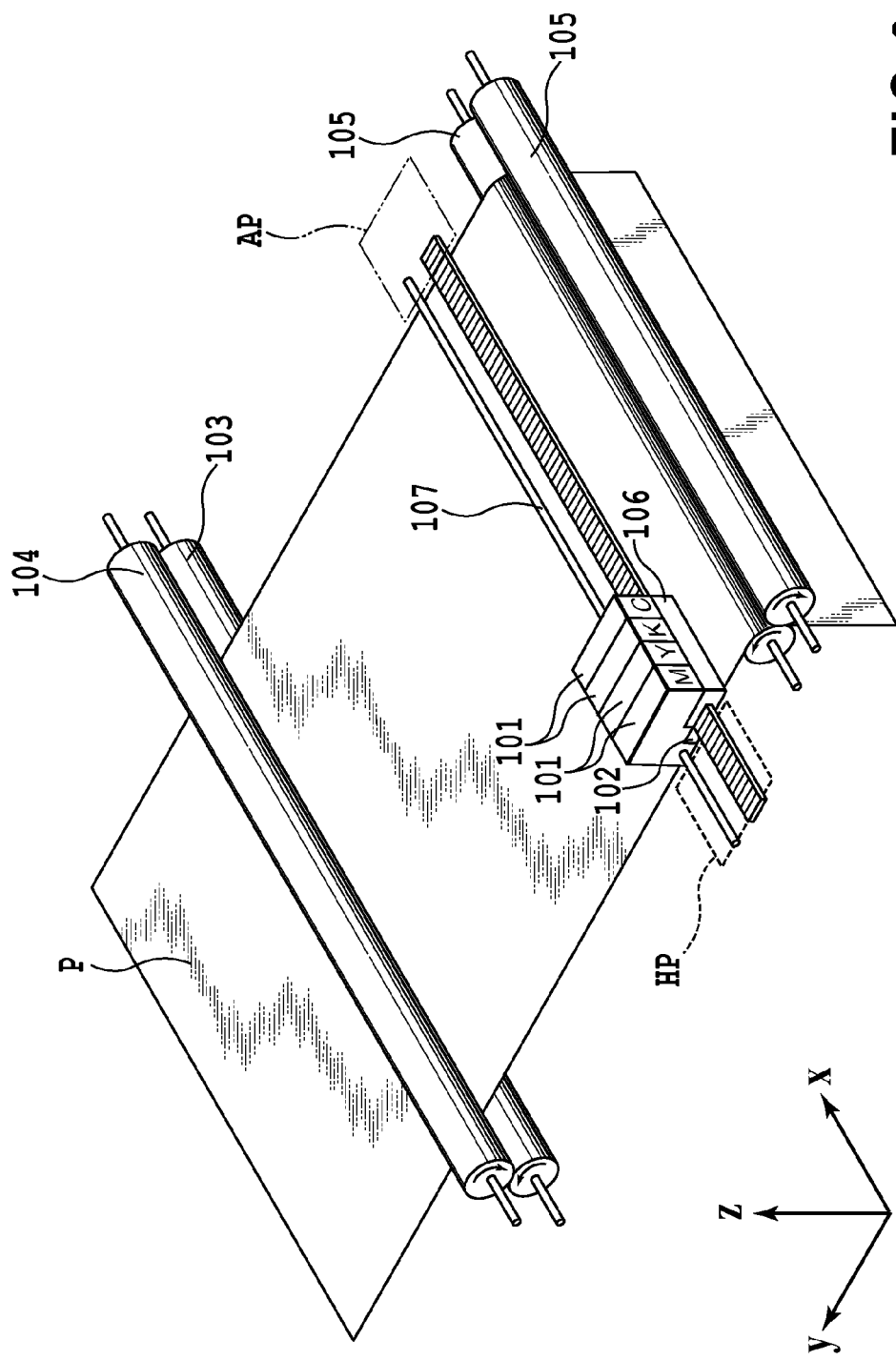
FIG. 6 is a perspective view of the schematic configuration of the ink jet printing apparatus of a first embodiment of the present invention.

FIG. 6 is a perspective view of the schematic configuration of the ink jet printing apparatus of a first embodiment of the present invention. In FIG. 6, 101 denotes ink tanks, and the ink tanks 101 respectively store magenta (M), yellow (Y), black (K) and cyan (C) ink. The ink that is stored in the ink tanks 101 is supplied through ink supply paths (not shown) to the corresponding print heads 102. The ink tanks 101 and the print heads 102 are mounted on a carriage 106 and accordingly can be moved along the guide rail 107 in the direction indicated by the X arrow and in the direction opposite thereto. This print head unit (including the ink tanks 101, print heads 102 and carriage 106) stops at the home position HP at non-printing times. Movement (scanning) occurs in the direction indicated by the X arrow, ink is ejected from the print heads 102 while this movement occurs, and printing is performed. When the carriage 106 is moved to the away position AP, which is the reference position opposite to the home position of the travel range of the carriage, a print medium P such as printing paper is conveyed a predetermined distance in the direction indicated by the Y arrow. The conveying rollers 103 and 104 rotate in conjunction with the paper feeding roller 105 and the print medium P is conveyed in the paper discharge direction. It is possible to perform printing on the entire print medium P by way of repeatedly alternating print scans of print heads 102 and conveyance of the print medium by the rotation of the paper feed rollers 105 and the conveying rollers 103 and 104.

Figure 7:
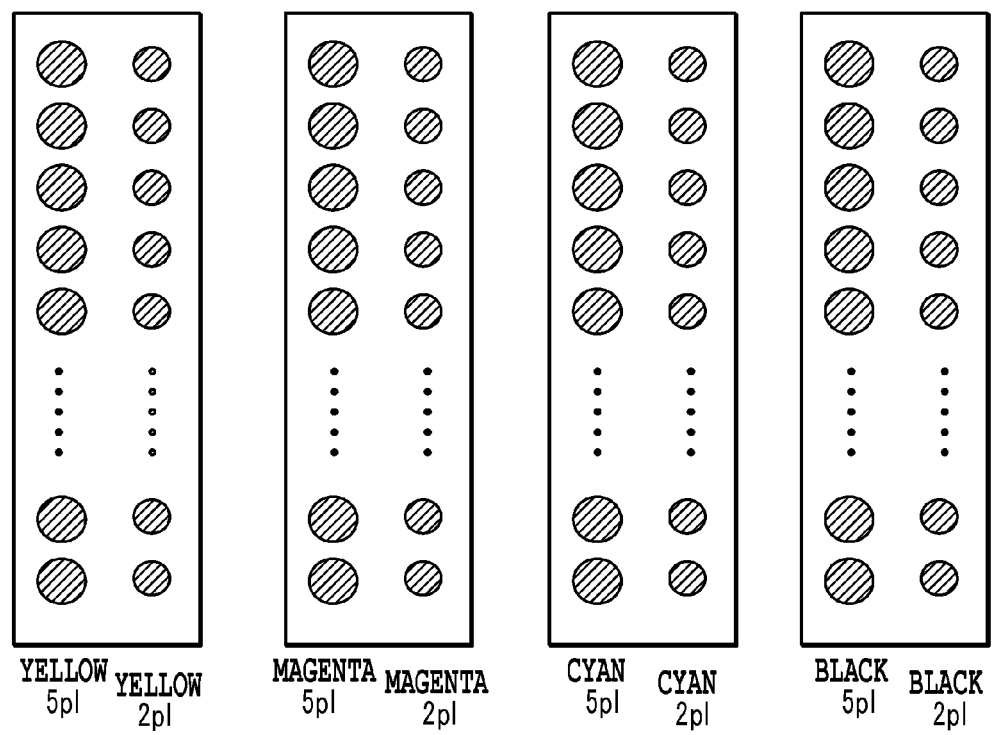
FIG. 7 is a diagram that explains the configuration of the ejection port arrays of the print heads of the first embodiment.

FIG. 7 is a diagram that schematically shows the ejection port arrays of the respective yellow (Y), magenta (M), cyan (C) and black (k) print heads 102. As shown in FIG. 7, the print heads of each ink color are respectively provided with 2 types of ejection ports; large ejection ports capable of ejecting ink of an ejection volume of 5 pl and small ejection ports capable of ejecting ink of an ejection volume of 2 pl.

Figure 8:
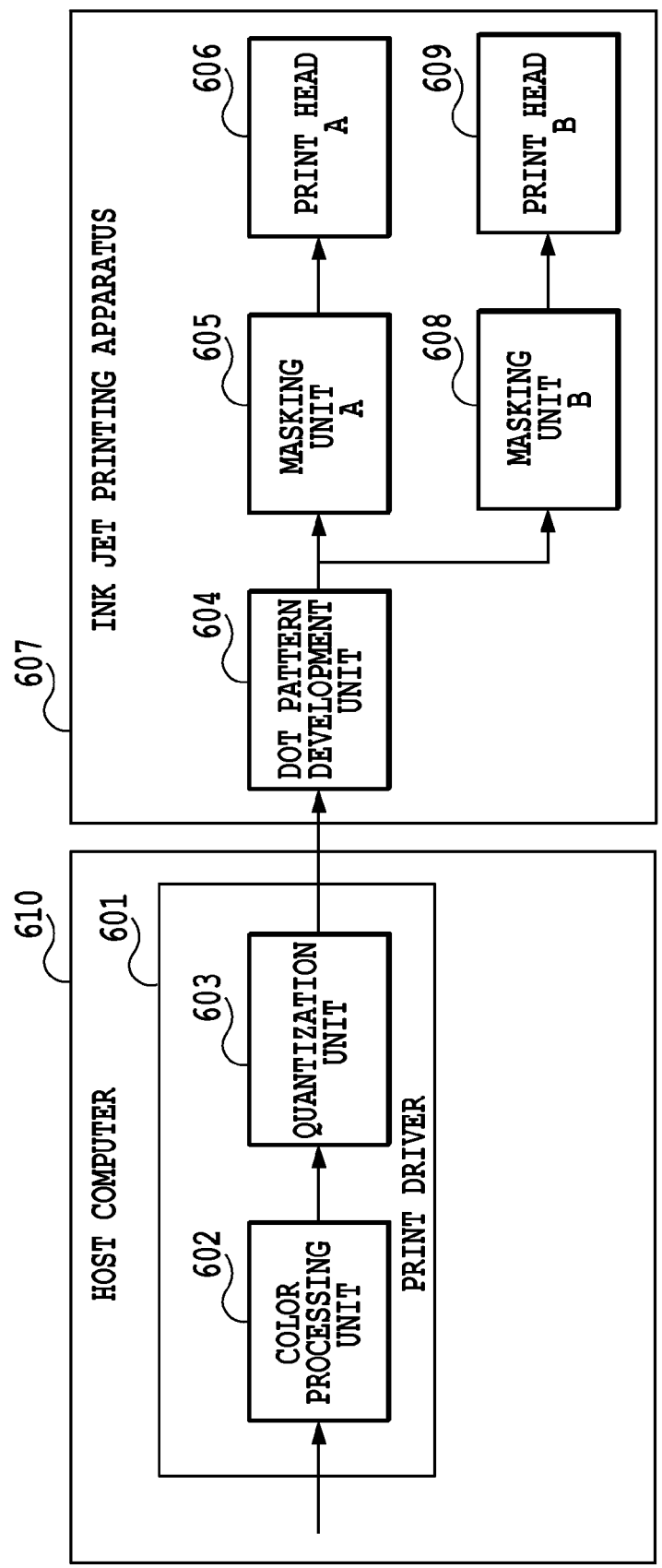
FIG. 8 is a block diagram that illustrates the configuration of the print data generation process of the first embodiment.

FIG. 8 is a block diagram that illustrates the configuration of the print data generation process of the present embodiment. In FIG. 8 610 denotes the host computer and 607 denotes the ink jet printing apparatus. The print driver 601, which is driven by the host computer 610, generates image data for printing by the ink jet printing apparatus. More concretely, the print driver 601 functions as a color processing unit 602 and a quantization unit 603. The color processing unit 602 converts the input RGB multi-valued image data, of 8-bits per color, into image data of each ink color to be used by the ink jet printing apparatus. Generally, making use of a LUT, for example, a total of 24 RGB bits are converted to CMYK data, of 8-bits per color. Next, the quantization unit 603 converts the 8-bit image data, of each color, that is, 256 level image data, into image data having a lower number of levels (9 levels in the present embodiment). In this case, in simply decreasing the number of gradations, because there is a considerable loss in the number of levels, an error diffusion process is generally employed in the area of the processed image pixel, which disperses quantization errors when quantization from 256 levels to 9 levels is performed. The image data, of each color, quantized into 9 levels by the quantization unit 603, is transmitted to the ink jet printing apparatus 607.

The 9 level image data, transmitted from the host computer 610, is developed into a dot pattern comprised of multiple dots by the dot pattern development unit 604 of the ink jet printing apparatus 607.

Figure 9:
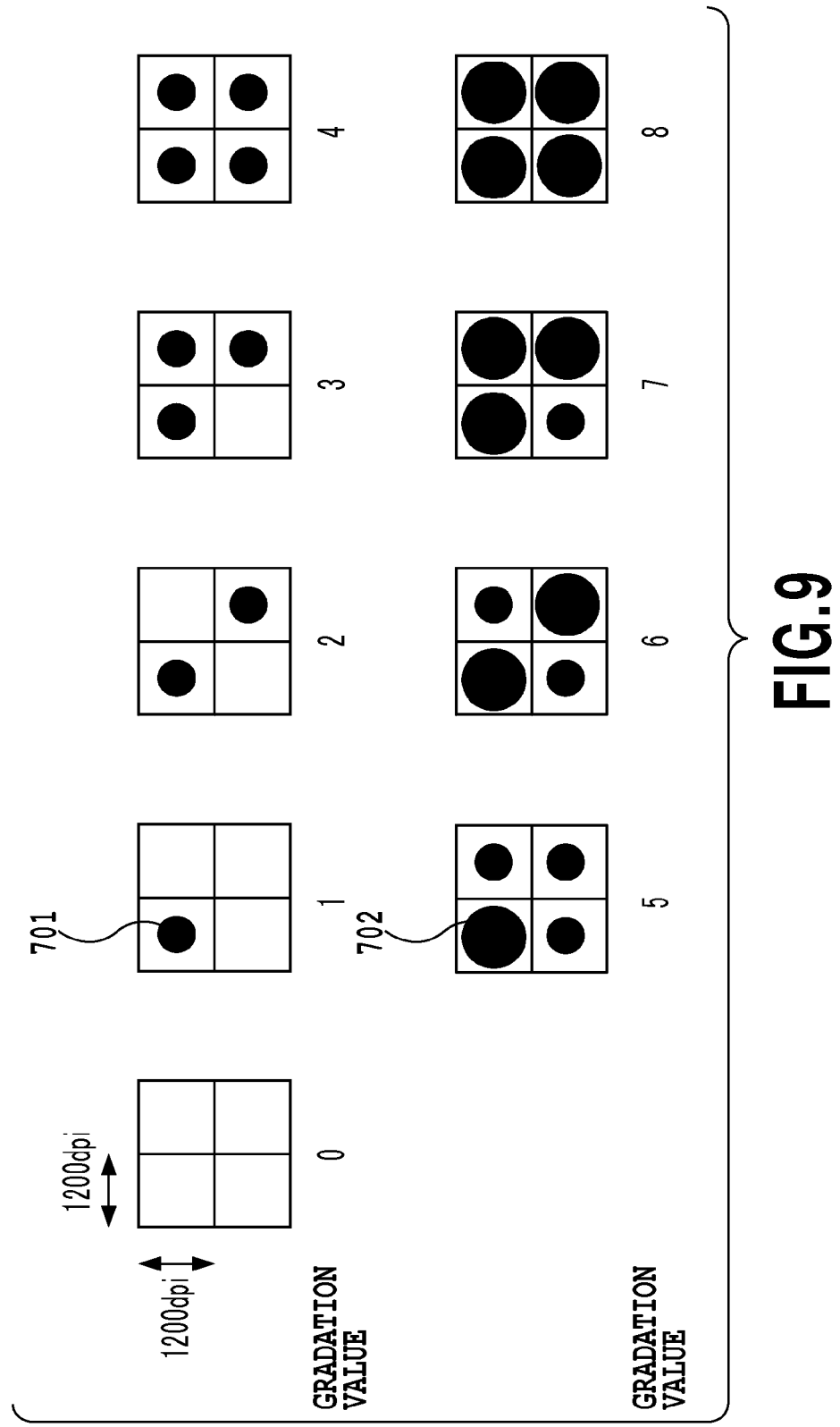
FIG. 9 is a diagram that explains the dot pattern development in the above print data generation.
Figure 10:
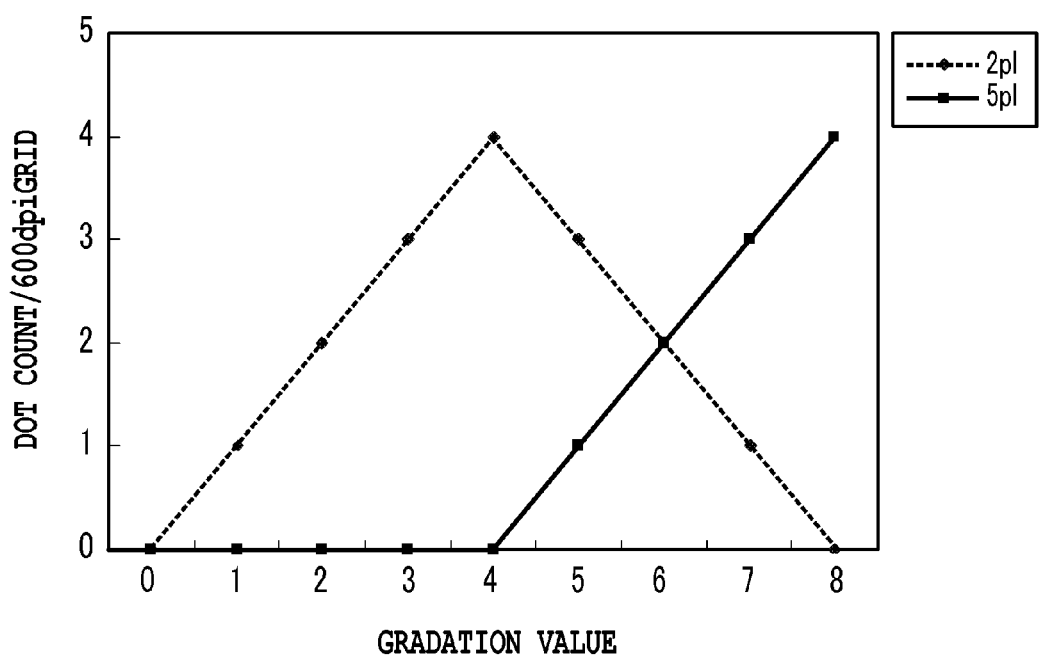
FIG. 10 is a diagram that illustrates the relationship between the gradation value input into the dot pattern development unit of the above print data generation and the number of dots (caused by 2 pl and 5 pl ink) present in a 2×2 pixel.

FIG. 9 is a diagram that explains the development of dot patterns. Respective 2×2 pixel dot patterns correspond to the 9 levels inputtable into the dot pattern development unit 604, that is, corresponding to the data graded into nine levels 0, 1, 2, 3, 4, 5, 6, 7 and 8. In the present embodiment as one pixel has a resolution of 1200 dpi×1200 dpi, the resolution of the 2×2 pixel dot pattern itself is 600 dpi×600 dpi. More specifically, the image data transmitted from the host computer has a resolution of 600 dpi×600 dpi and it is converted to a resolution of 1200 dpi×1200 dpi by the dot pattern development unit 604. Also, the dot patterns corresponding to the 9 levels are comprised of combinations of dots of 2 sizes at the 2×2 pixel. The small sized dot 701 is formed of ink with an ejected volume of 2 pl ("first ink drop") and the large sized dot 702 is formed of ink with an ejected volume of 5 pl ("second ink drop"). FIG. 10 is a diagram that illustrates the relationship between the gradation value input into the dot pattern development unit 609 and the number of dots (caused by 2 pl and 5 pl ink) present in a 2×2 image.

Referring back to FIG. 8, the available dot data (print data), developed by the dot pattern development unit 604 into a dot pattern of 2 types of dots, 2 pl and 5 pl, is partitioned into dots of each ejection volume. That is, 2 pl dot data is input into the masking unit A (605) and 5 pl data is input into the masking unit B (608). For example, as for the data of the dot pattern with a gradation value of "3", because it consists entirely of 2 pl dot data, these 3 dot data are wholly input into the masking unit A at a resolution of 1200 dpi×1200 dpi with their respective pixel locations maintained. On the other hand, for example, as for the dot pattern data with a gradation value of "6", 2 dot data are input into the masking unit A and the remaining 2 dot data are input into the masking unit B, each at a resolution of 1200×1200 dpi with their respective pixel locations maintained. Next, at the masking unit A (605) and the masking unit B (608), masking is performed, for partitioning each of the input 2×2 pixel dot patterns into image data for each pass of the executed multi-pass printing.

It should be noted that this multi-pass printing is of a form wherein print data is allocated (partitioned) into multiple scans and printing is performed by carrying out multiple scans of the print head at the same area. This form is not only serial type scanning of the print head on the print medium but also printing methods made possible by the so-called full line method. That is, by arranging a plurality of print heads ejecting ink of the same color and conveying (scanning) the print medium in relation to the plurality of print heads, it is possible to complete the printing of a predetermined region in the course of this relative movement. From the above, the present invention can be applied to a multi-pass printing that executes the printing of a predetermined region by scanning the print head multiple times in relation to the print medium.

Figure 11:
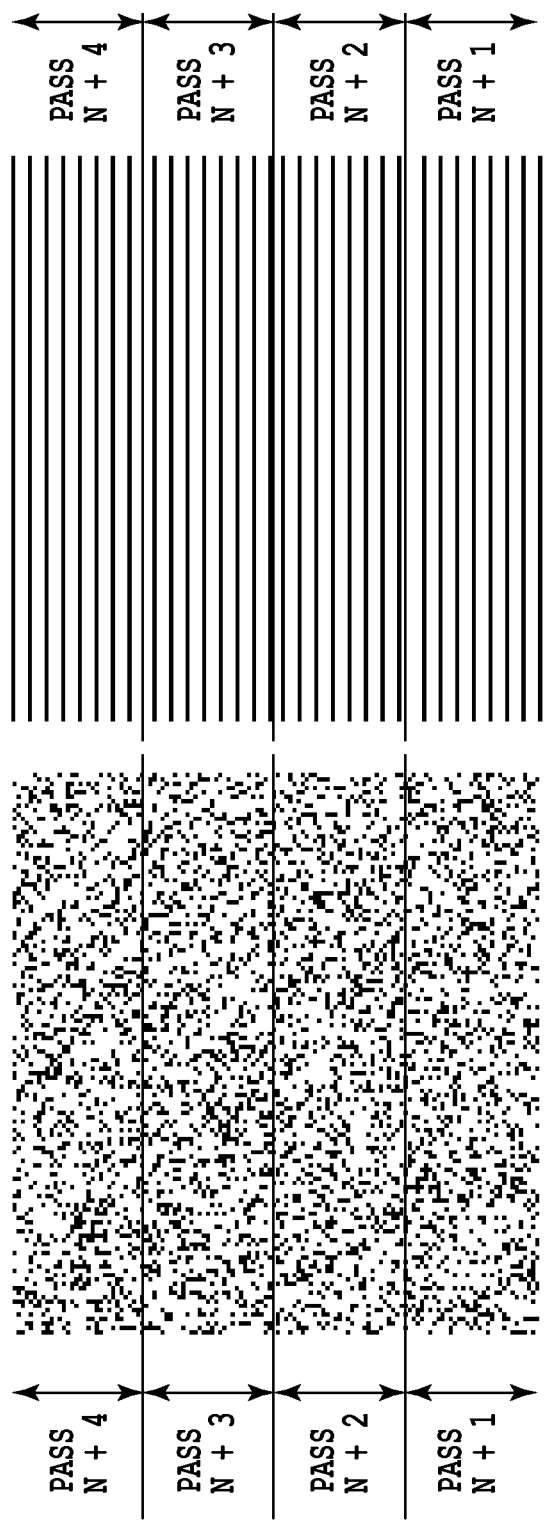
FIGS. 11A and 11B are diagrams that illustrate the mask patterns that are respectively employed by the masking units A and B in the above print data generation.

FIGS. 11A and 11B are diagrams that illustrate the mask patterns that are respectively employed by the masking units A and B. In these mask patterns, the mask pixels shown in black are the print permitted pixels mentioned above, and pixel print data corresponding to these mask pixels are output in the print data. On the other hand, the mask pixels shown in white are non print permitted pixels and pixel print data corresponding to these mask pixels are not output in the print data (masked). The mask pattern shown in FIG. 11A is a random pattern mask as mentioned above (non-periodic pattern). On the other hand, the mask pattern shown in FIG. 11B is a mask with an interlaced pattern for carrying out so-called interlaced printing, wherein in the main scanning direction dots are consecutively arranged and in the sub-scanning direction dots are not consecutively arranged. The patterns shown in FIGS. 11A and 11B are both mask patterns for use in a 4 pass multi-pass printing.

Figure 12:
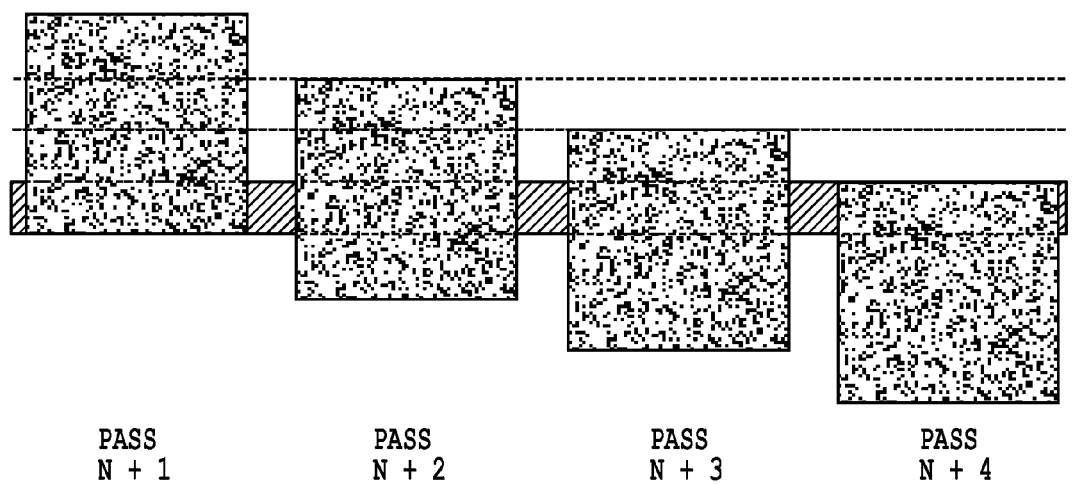
FIG. 12 is a diagram that explains the application of the mask patterns shown in FIGS. 11A and 11B to a 4 pass multi-pass printing.

FIG. 12 is a diagram for explaining the application of the mask patterns shown in FIGS. 11A and 11B in a 4 pass multi-pass printing. FIG. 12 is related to an example employing the random mask pattern shown in FIG. 11A but may also be applied in the same manner in the case where the mask pattern shown in FIG. 11B is used. The number of passes in the multi-pass printing of the present embodiment is 4, and the region corresponding to the area marked with diagonal lines in the figure is printed by 4 scans, from pass N+1 to pass N+4. Thus the arrangement of the print permitted pixels of each of the mask patterns applied to the diagonally lined region of the figure have a complementary relationship to each other.

FIGS. 13A and 13B are diagrams that explain the respective partitioning of print data using the mask patterns of FIGS. 11A and 11B, that is, they explain the print data (dot data) of a scanning unit that is obtainable from carrying out a print data thinning operation. FIG. 13A illustrates a case where a random mask pattern is used, and leftmost FIG. 13A shows a binary image (print data) before the mask process is performed. This binary image is data input from the dot pattern development unit 604 shown in FIG. 8. It should be noted that while the binary images shown in FIGS. 13A and 13B are shown as the same image for purposes of simplification of the drawings, in actuality the input binary images input into the respective masking units A and B differ as described with respect to FIG. 8.

Next, the middle FIG. 13A illustrates the random mask pattern used by the masking unit A shown in FIG. 8. By way of performing a AND between the above binary image and each corresponding pixel of the random mask pattern, the binary image is converted into dot data (a scan image) for each scanning unit, as shown in rightmost FIG. 13A. The mask pattern of the example illustrated in FIG. 13B is an interlaced mask and a scan image can be obtained in the same manner.

When the scan images of FIG. 13A and FIG. 13B are compared, the image of FIG. 13A, from the influence of the randomness of the mask pattern, has become an image characterized in that it contains a large number of low frequency components. On the other hand the scan image of FIG. 13B is characterized in that it has a smaller number of low frequency components in comparison to FIG. 13A, because the mask pattern is a pattern having interlaced printing periodicity.

The low frequency component characteristics of these scan images, as described above, exert an influence on stripe-like density unevenness and graininess when there is the occurrence of a conveyance distance error such as kicking. In the case where a random mask pattern having a large number of low frequency components in the scan image is employed, when there is an occurrence of a conveyance distance error it is possible to reduce the resultant stripe-like density unevenness but it is not possible to suppress the low frequency noise, that is, the graininess, in the image.

Figure 4B:
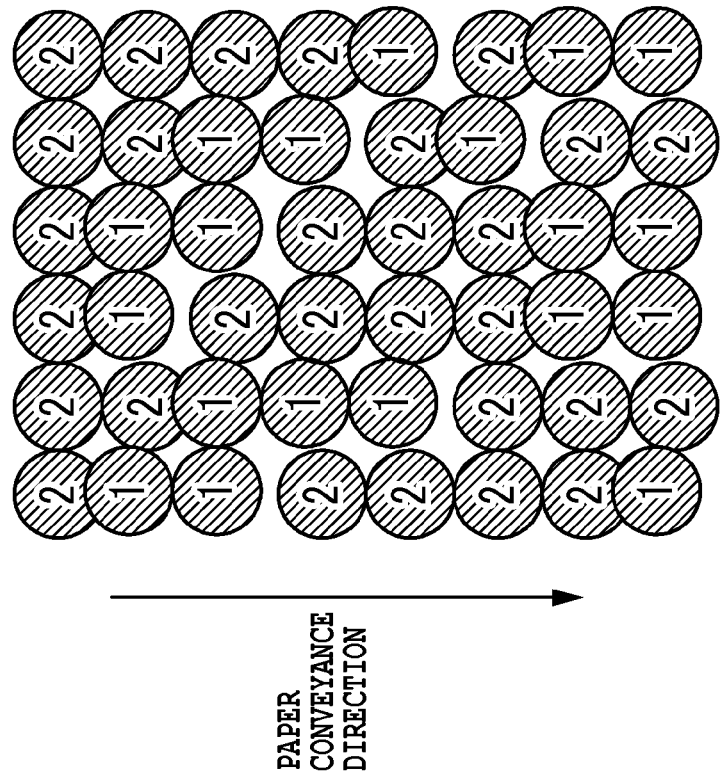
FIGS. 4A and 4B are diagrams that explain that in the case of a random mask pattern a decline in the dot coverage ratio is unlikely to occur due to a conveyance distance error.
Figure 4A:
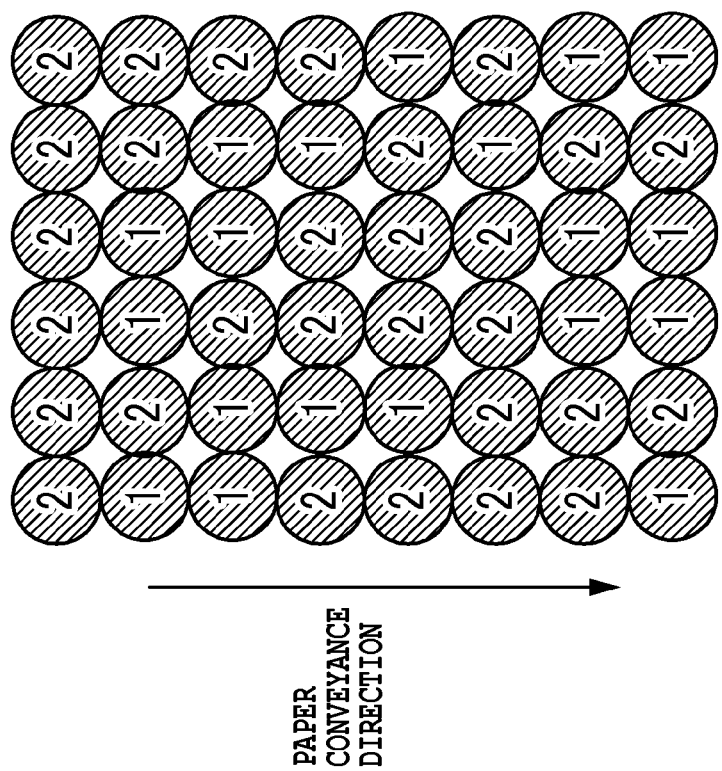
Figure 5:
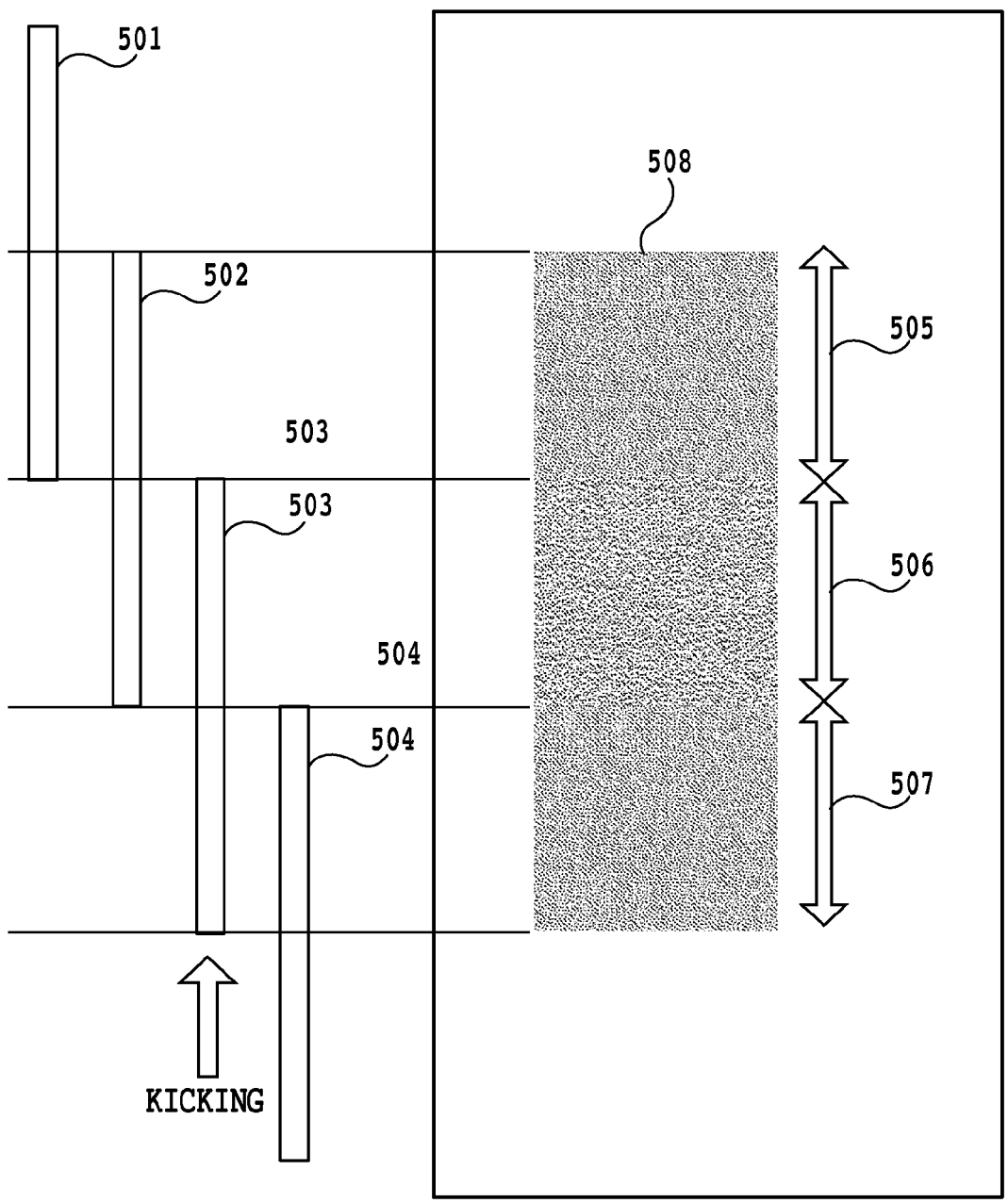
FIG. 5 is a diagram that explains the change in graininess when a conveyance distance error occurs.
Figure 14B:
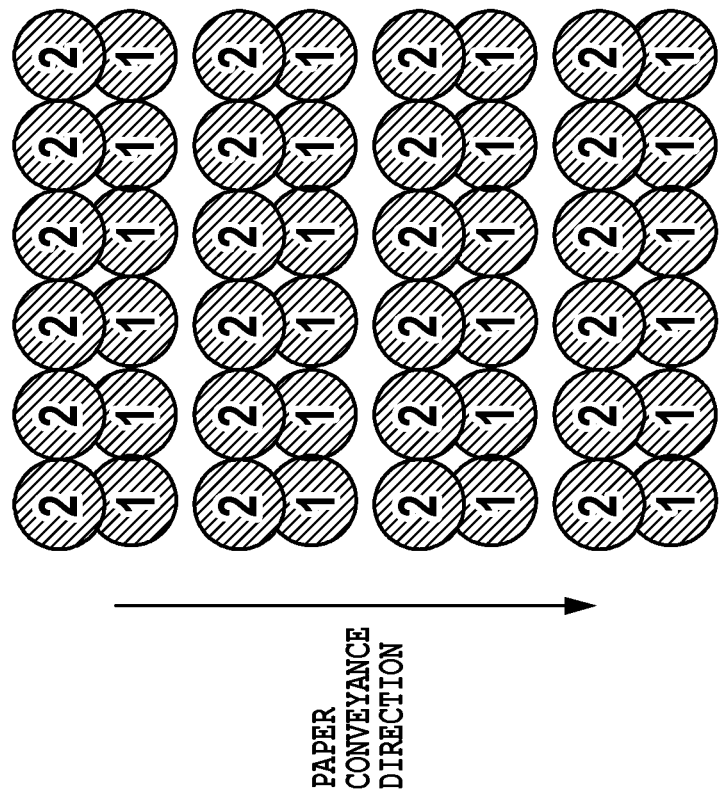
FIGS. 14A and 14B are diagrams that explain the stripe-like density unevenness that occurs when a conveyance distance error such as kicking occurs when printing with an interlaced mask pattern.
Figure 14A:
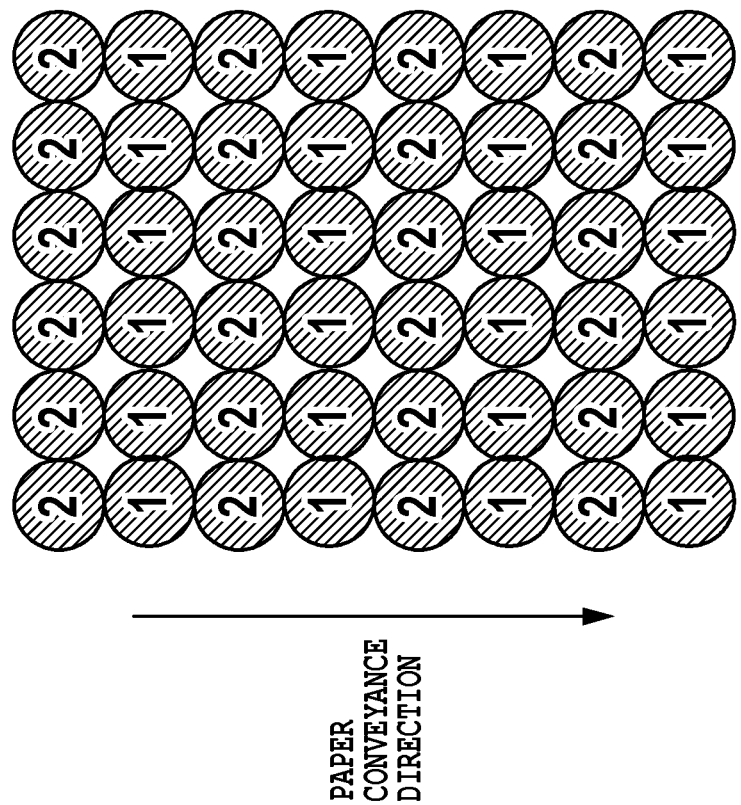

On the other hand, in the case where an interlaced mask pattern is employed, when a conveyance distance error occurs, as with the above described staggered mask pattern it is possible to reduce graininess but stripe-like density unevenness occurs easily. FIGS. 14A and 14B are diagrams that explain the stripe-like density unevenness that occurs when a conveyance distance error such as kicking occurs when printing with an interlaced mask pattern. FIG. 14A illustrates a printed state wherein, in the case where an interlaced mask is employed, there is not a conveyance distance error and the dots are printed at their ideal locations, and FIG. 14B illustrates a printed state where a conveyance distance error has occurred. When the printed state illustrated in FIG. 14B and the printed state illustrated in FIG. 4B, which makes use of a random mask pattern, are compared, the decline in the coverage of the printing illustrated in FIG. 14B, in relation to the ideal state, is larger. This is because, as described above, in the arrangement of dots in the sub-scanning direction, due to the interlaced mask pattern, dots of the same pass are not consecutively arranged.

In this way, with respect to stripe-like density unevenness and graininess caused by a conveyance distance error such as kicking, there is a trade-off relationship between the case of using a random mask versus the case of using an interlaced mask. That is, in the case where suppression of density unevenness is of consideration it is preferable to make use of a random mask pattern, and in the case where suppression of graininess is of consideration it is preferable to make use of a periodic mask pattern such as an interlaced mask.

However, as described above, among the above image defects graininess changes according to ink drop volume, that is, according to the size of the dot formed by an ink drop. More specifically, graininess becomes more remarkable as dot diameter increases and inversely less conspicuous as dot size decreases.

This is also clear from the standpoint of the human visual spatial frequency characteristic. As for the human visual spatial frequency characteristic VTF (Visual Transfer Function), the evaluation function is described by Roetling in "Visual Performance and Image Coding", Image Processing, SPIE/OSA Vol. 74, pp 195-199 (1976). This evaluation function is defined by the equation below.

$$VTF = 5.05 \times \exp(-0.138 \times u) \times (1 - \exp(-0.1 \times u)) \ U = f \times R \times \pi/180 \text{ (cycles/degree)}$$

f: spatial frequency (cycles/mm)
R: observed distance (mm)

Figure 15:
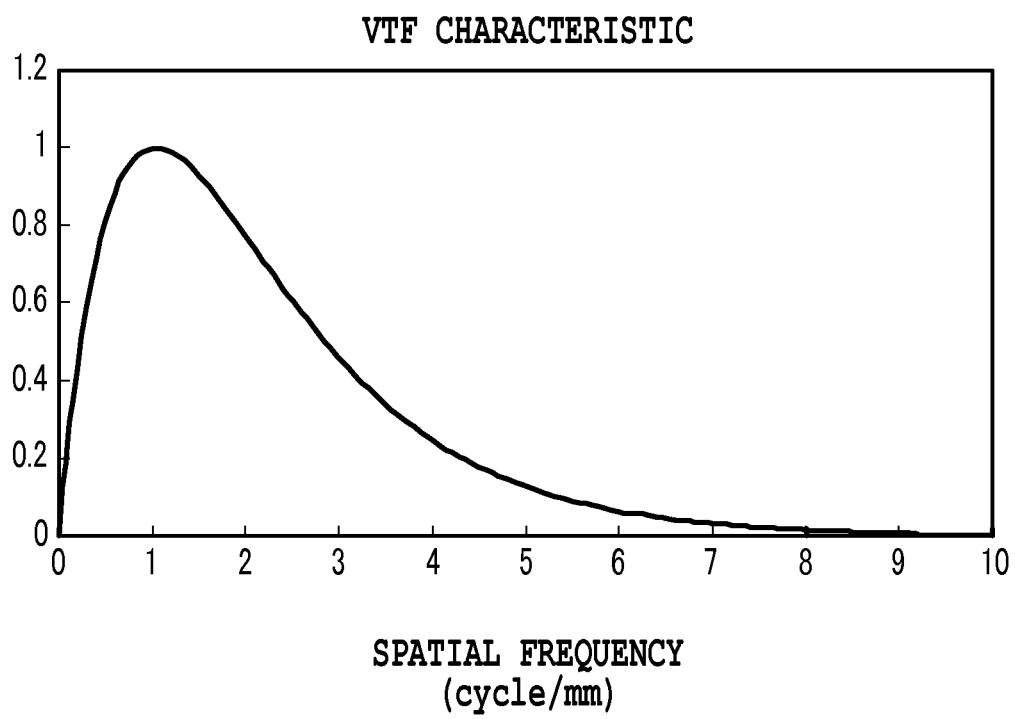
FIG. 15 is a diagram that explains human sight characteristics.

Furthermore, in relation to the above equation, a graph of the VTF characteristic is illustrated in FIG. 15, for the case where the standardized observed distance is 300 mm. As is readily apparent from the figure the vicinity of 1 cycle/mm has the highest visual sensitivity and as the frequency is further increased it gradually decreases. Thus, in recent ink jet printing apparatuses in which dot diameters are a few dozen microns, as dot size becomes smaller they become more difficult for humans to see. Consequently graininess, due to kicking, becomes less conspicuous.

Figure 16A:
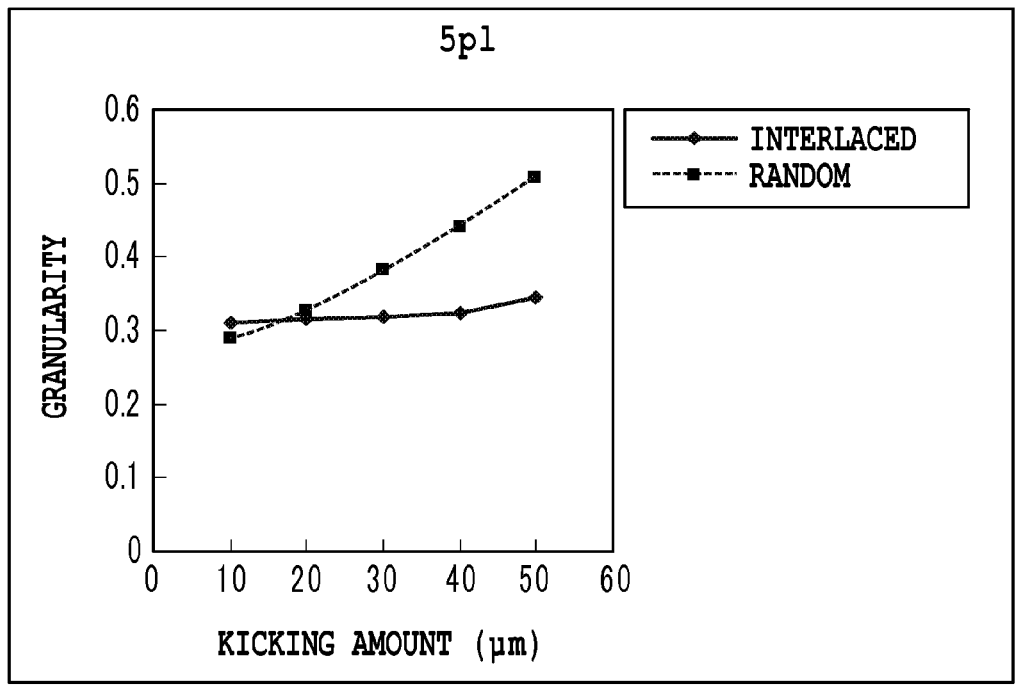
FIGS. 16A and 16B are diagrams that explain the change in graininess according to the size of the conveyance distance error (amount of kicking), for each ejection amount.
Figure 16B:
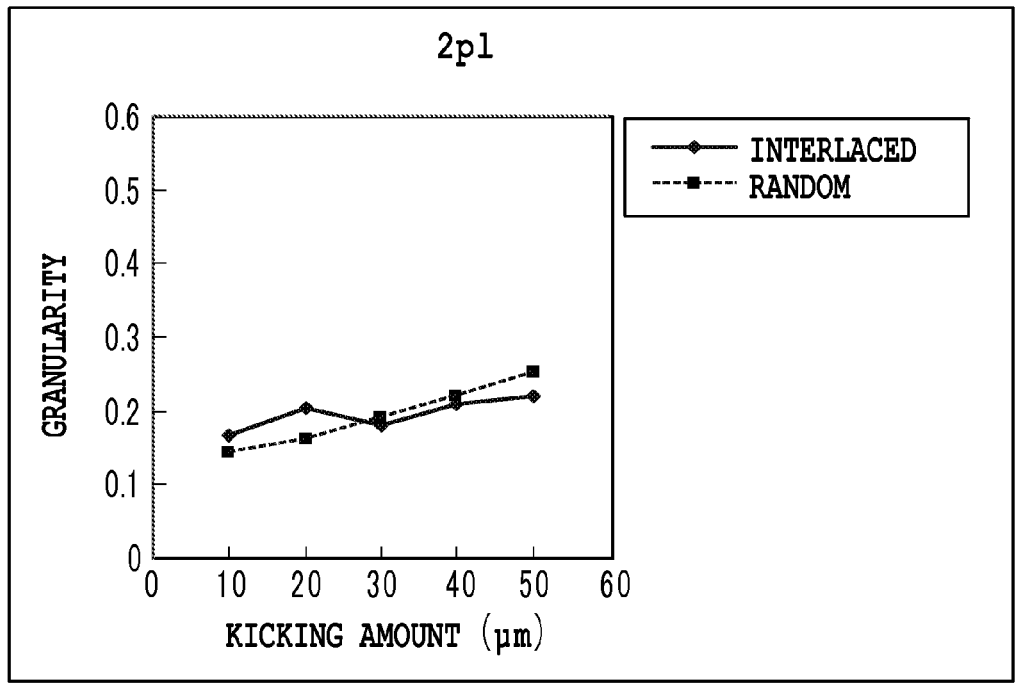

FIGS. 16A and 16B are diagrams that explain the change in graininess according to the size of the conveyance distance error (amount of kicking). A method for expressing graininess as an evaluated value (granularity) is described in Japanese Patent Laid-Open No. 2007-129652. FIG. 16A compares the change in graininess, in the case of performing printing with an ejection volume of 5 pl, between the case where a random mask pattern is used and the case where an interlaced mask pattern is used. As shown in FIG. 16A, in the case of the random mask pattern graininess increases as the conveyance distance error, caused by kicking, increases while in the case of the interlaced mask pattern the change in graininess is small.

On the other hand, FIG. 16B illustrates change in graininess versus kicking when printing with an ejection volume of 2 pl. The inclination of the change in graininess attributable to random masks and the interlaced masks does not change in this case. However, the absolute granularity value is lower, in the case where a random mask pattern is used, than when printing with an ejection volume of 5 pl. Also where the amount of kicking is less than 30 μm the granularity, when a random mask pattern is used, is lower. Moreover, in the experience of the inventors of the present invention it is understood that when the graininess, represented here as a numerical value, is at 0.3 or below, it is at a permissible level as an image defect. Because of this it is acceptable to use both interlaced mask patterns and random mask patterns where an ejection volume of 2 pl is used.

On the other hand, with respect to stripe-like density unevenness, the other image defect problem caused by a conveyance distance error such as kicking, random mask patterns are preferred over interlaced mask patterns regardless of the size of the ejection volume.

From the above point, in the case of an ejection volume of 2 pl it is advantageous, from the standpoint of graininess and density unevenness to use a random mask pattern. On the other hand, in the case of an ejection volume of 5 pl, from the standpoint of graininess, as also clear from FIG. 16A, interlaced masks are preferable, but there is the problem of the easy occurrence of stripe-like density unevenness. However, in the present invention, as shown in FIG. 10, in the case where an image combining 2 types of dots, with ejection volumes of 5 pl and 2 pl, is printed, printing is carried out only with an ejection volume of 2 pl at low density regions (the gradation values from 0 to 3 in FIG. 10). Next, at the medium to high density region (the gradation values from 4 to 8 in FIG. 10), the region where an ejection volume of 5 pl is used, because 2 pl dots are also formed stripe-like density unevenness does not readily stand out. Thus in the case where an ejection volume of 5 pl is used emphasis is given to the reduction of graininess and an interlaced mask is chosen.

As explained above, in the present embodiment, in the case where image formation is carried out by 2 types of dots with differing ejection volumes of 5 pl and 2 pl, an interlaced mask pattern is used in respect to 5 pl data and random mask pattern is used in respect to 2 pl data. Herewith it has become possible, at all gradations, to suppress the 2 image defects, density unevenness and graininess, caused by conveyance distance errors.

It should be noted that while, in the above embodiment, a random mask pattern was used when printing dots with a small ejection volume, that is, dots with a small diameter, and an interlaced mask pattern was used when printing dots with a large ejection volume, that is, dots with a large diameter, the invention is not so limited. For example, in the case of printing dots with a small diameter, a mask pattern with a high dispersion, that is, with so-called blue noise characteristics, may also be used. Also, in the case of printing dots with a large dot diameter, a so-called fixed mask pattern may be used, wherein a single cluster comprises a 2×2 pixel unit or a 4×4 pixel unit, and such clusters are periodically arranged.

That is, isotropic mask patterns with high dispersion are used in print data generation for the ejection of ink drops having a relatively small ejection volume. In other words, a mask is used in which the arrangement pattern of print permitted pixels has a large number of low frequency components in comparison to the mask used in the case of ejecting ink drops with a relatively large ejection volume. On the other hand, patterns with high periodicity are used in print data generation for the ejection of ink drops having a relatively large ejection volume. In other words, a mask is used in which the arrangement pattern of print permitted pixels has a relatively small number of low frequency components.

Also, in the above embodiment, while, in the case of expressing gradation, as shown in FIG. 10, there is a gradation region expressed by a combination of large and small dots, and dot data is structured as large and small dots in a single plane of print data, the invention is not so limited. For example, by dividing the gradations into a gradation region using large dots and a gradation region using small dots, two planes of print data, a large dot plane and a small dot plane, are also acceptable. In this case an interlaced mask is used for the large dot plane and a random mask is used for the small dot plane. However, when performing processing by way of independent large and small dot planes, the immediate use of large dots, from a state wherein small dots are substantially not printed, is also possible as a combination. To this end, before dividing into large and small dot planes, it is preferable to consider the small to large dot ratio and control such that large dots are used after a fixed amount of small dots are used.

It is also possible to apply the present invention to a case such as where a large dot printing mode and a small dot printing mode are separately executed. That is, it is possible to use an interlaced mask in the large dot mode, to use a random mask in the small dot mode, and generate respective multi-pass print data.

It should be noted that while the first embodiment explained above had ink ejection ports, which eject large and small ink drops of the same color, integrally provided on a single print head, it goes without saying that the invention is not limited as such. It is also acceptable to configure separate print heads the ejection ports of which respectively eject large and small ink drops.

(Second Embodiment)

The second embodiment of the present invention is not configured, like the first embodiment, to perform printing by large and small drops, but rather is concerned with a configuration that uses dark and light ink in performing printing.

Figure 17:
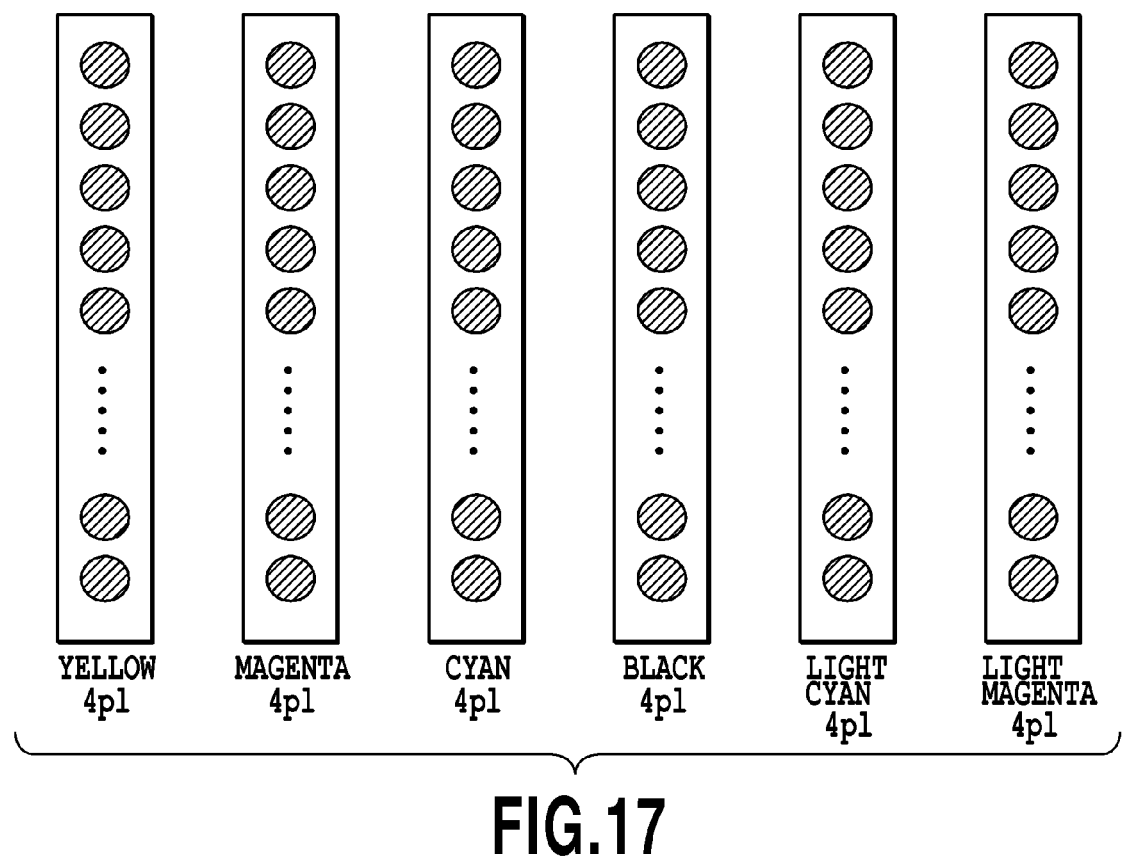
FIG. 17 is a schematic view of the ejection port surface of the print heads employed in the ink jet printing apparatus of a second embodiment of the present invention.

FIG. 17 is a schematic view of the ejection port surface of the print heads employed in the ink jet printing apparatus of the present embodiment. In the present embodiment, in addition to the ink print heads for 4 colors of Y, M, C and BK used in the above described first embodiment, in regard to cyan and magenta, print heads of light magenta (LM) ink and a light cyan (LC) ink having a weak color concentration of dye or pigment are also used. The ejection volume of a single ejection port is 4 pl in all of the print heads. Because C ink and M ink generally have a high dot contrast, in order to improve graininess, dots with a small ejection volume are used as in the first embodiment described above, or, as in the present embodiment, ink with a low color concentration is used for C ink and M ink.

Figure 18:
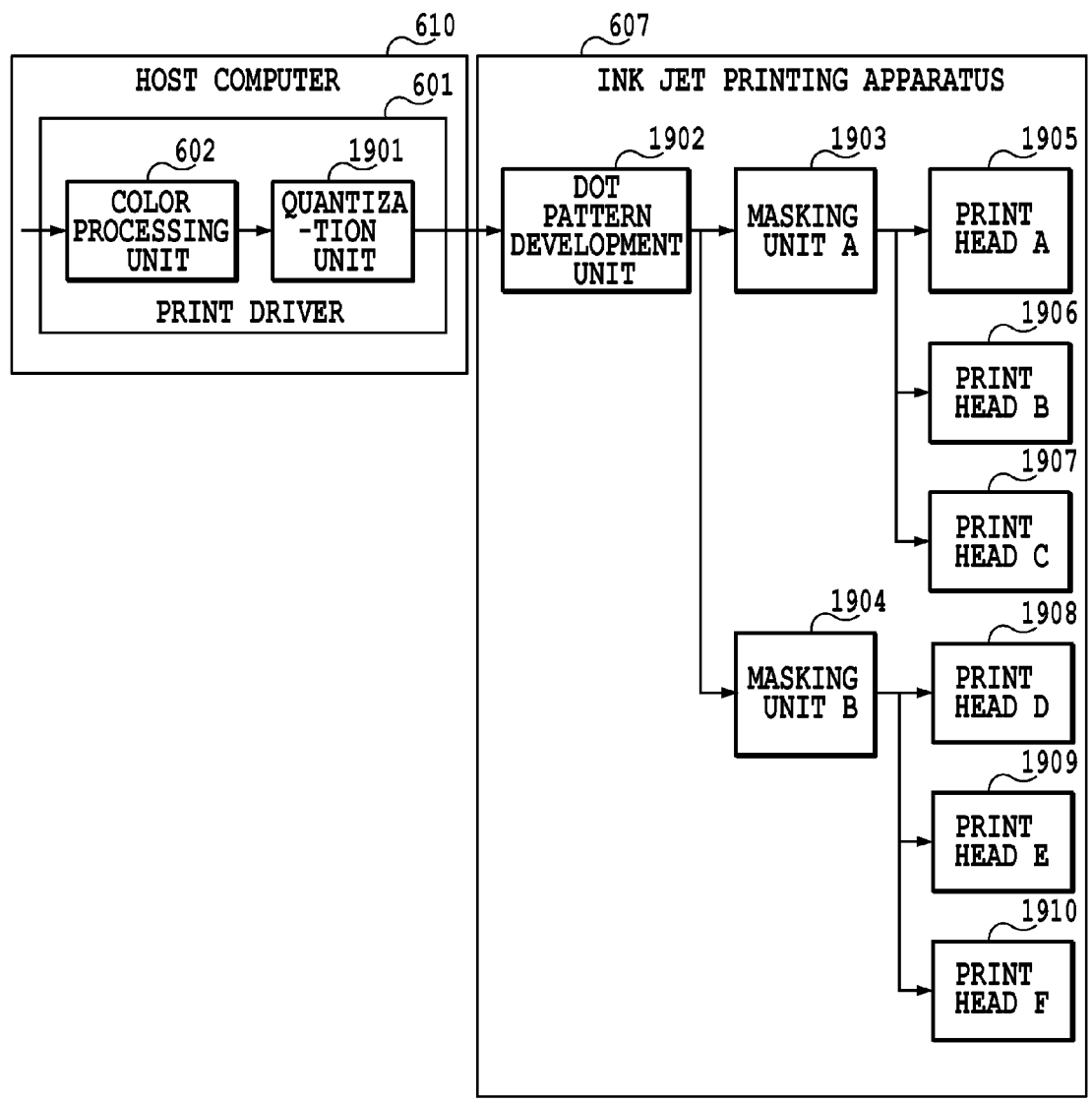
FIG. 18 is a block diagram that illustrates the configuration of the print data generation process of the second embodiment.

FIG. 18 is a block diagram that illustrates the configuration of the print data generation of the present embodiment. Components that are the same as those of the first embodiment shown in FIG. 1 are marked with similar reference symbols and the corresponding explanations have been omitted. The quantization unit 1901 of the host computer 610 quantizes from 8 bit data, of each color, that is, 256 level data, to 5 level data. Next, this 5 level data sent from the host computer 610 is developed into a 2×2 pixel dot pattern by the dot pattern development unit 1902. FIG. 19 is a diagram that explains the development of dot patterns. As shown in the same figure, respective 2×2 pixel dot patterns are developed for the 5 level print data, that is, for data graded into levels 0, 1, 2, 3 and 4. The size of the dots, differing from the first embodiment described above, is of only 1 type.

Among the image data developed into a 2×2 pixel dot pattern, of each color, at the dot pattern development unit 1902, the low brightness ink image data (wherein the formed dots have a high density), that is, the C, M, and BK ink image data, are respectively input into the masking unit A (1903). On the other hand, high brightness ink image data (wherein the formed dots have a high density), that is, the Y, LC, and LM ink image data, are respectively input into the masking unit B (1904). Next, at the masking unit A (1903), a masking process is carried out by an interlaced mask pattern that can control graininess caused by a conveyance distance error such as kicking, and the resultant image data is sent to the print heads for C, M, and BK, 1905, 1906 and 1907, respectively. At the masking unit B (1904), a masking process is carried out by a random mask pattern that can control stripe-like density unevenness caused by a conveyance distance error, and the resultant image data is sent to the print heads for Y, LC, and LM ink, 1908, 1909 and 1910, respectively.

Figure 20A:
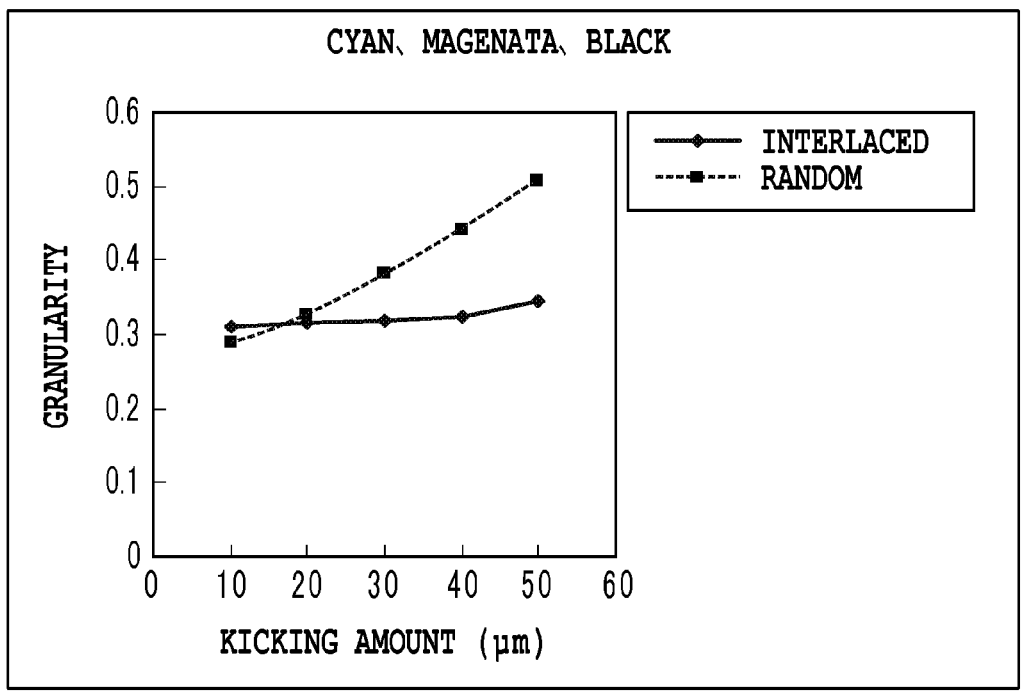
FIGS. 20A and 20B are diagrams that illustrate, for low and high brightness ink respectively, the amount of graininess in accordance with the size of the conveyance distance error (amount of kicking).
Figure 20B:
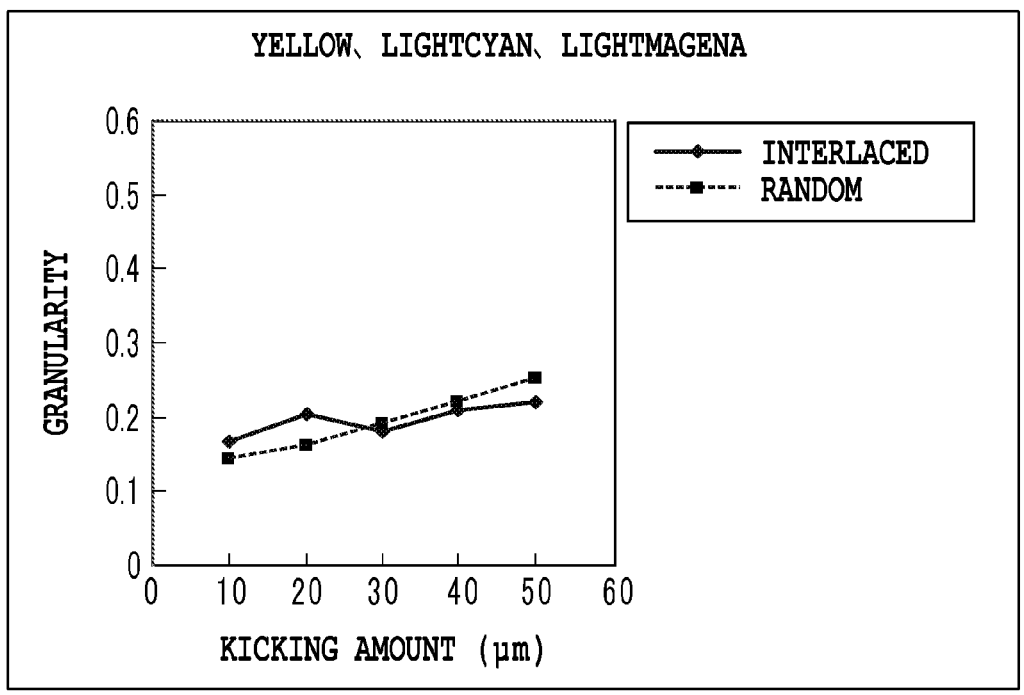

As above, in the present embodiment, the mask which is used differs depending on the brightness of the ink. FIGS. 20A and 20B are diagrams that illustrate, for low and high brightness ink respectively, the amount of graininess in accordance with the size of the conveyance distance error (amount of kicking). FIG. 20A compares the change in graininess, when carrying out the formation of an image with low brightness C, M, BK ink, between the case where a random mask pattern is used and the case where an interlaced mask pattern is used. As shown in FIG. 20A, in the case of a random mask pattern graininess worsens remarkably as the error in the distance conveyed increases. In contrast, in the case of an interlaced mask pattern worsening of the graininess is small. On the other hand, as shown in FIG. 20B, in the case of carrying out the formation of an image with high brightness Y, LC or LM ink, the inclination of the change in graininess does not change depending on whether a random mask or interlaced mask is used. However, the absolute granularity value is lower, in the case where the random mask is used. Also, when a random mask pattern is used, granularity is lower where the error in the conveyed distance is less than 30 µm. In the present embodiment, in the same manner as the first embodiment described above, in the case where high brightness Y, LC and LM ink are used interlaced and random masks are both acceptable. On the other hand, with respect to suppressing stripe-like density unevenness, random mask patterns are preferred over interlaced mask patterns regardless of the brightness of the ink.

From the above, random mask patterns are used in the case of Y, LC and LM ink. On other hand, in the case of low-brightness ink such as C, M and BK ink, an interlaced mask pattern is used such that graininess does not stand out when there is the occurrence of a conveyance distance error. Because of this it is possible to obtain the same effect as previously described in the first embodiment.

As above, the present invention executes a multi-pass printing in which the printing of a scanning area having a width corresponding to a predetermined distance is completed by scanning the print head a plurality of times and conveying the print medium a predetermined distance in a direction crossing the direction of the scan during each of the scan intervals between the plurality of scans. When printing, it is possible to form on the print medium dots with a first size or a first density and other dots with a second size larger than the first size or a second density higher than the first density. For this reason thinned print data, used for the respective plurality of scans, is generated by preparing a mask for the print data of the scanning area having a width corresponding to a predetermined distance and performing a masking process. Regarding the data generation, masking of the print data for forming the dots of the first size is carried out using a mask that has a first amount of low frequency components in the arrangement pattern of print permitted pixels. Masking of the print data for forming the dots of the second size is also carried out, using a mask that has a second amount of low frequency components lower than the first amount, and each masking process is performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-279576, filed Dec. 9, 2009, which is hereby incorporated by reference herein in its entirety.

What is claimed is:

1. An ink jet printing apparatus, which uses a print head provided with ejection ports that eject ink drops having a first size and that are arranged in a sub-scanning direction, and ejection ports that eject ink drops having a second size larger than the first size and that are arranged in the sub-scanning direction, and performs printing an image by relative scanning of the print head and the print medium in a main-scanning direction crossing to the sub-scanning direction, comprising:

a printing unit configured to print the image to a predetermined region on the print medium by a plurality of scans of the print head; and a generating unit configured to generate first print data for ejecting ink drops having the first size for each of the plurality of scans by using a first mask pattern and generate second print data for ejecting ink drops having the second size for each of the plurality of scans by using a second mask pattern, wherein a number of low frequency components of a spatial frequency characteristic shown by an arrangement of print permitted pixels in the second mask pattern is lower than a number of low frequency components of a spatial frequency characteristic shown by an arrangement of print permitted pixels in the first mask pattern.

2. The printing apparatus according to claim 1, wherein the first mask pattern has a random pattern of print permitted pixels and the second mask pattern has an interlaced pattern of print permitted pixels, and in the interlaced pattern, print permitted pixels are consecutively arranged in the main-scanning direction and are not consecutively arranged in the sub-scanning direction.

3. An ink jet printing apparatus that, during a relative movement of a print head in a main-scanning direction, which comprises a first ejection port array, in which a plurality of ejection ports that eject first ink drops are arranged in a sub-scanning direction, and a second ejection port array, in which a plurality of ejection ports that eject second ink drops having a size larger than that of the first ink drops are arranged in the sub-scanning direction, performs printing by ejecting the first ink drops and the second ink drops onto the print medium from the print head, comprising:

a generation unit configured to generate first print data for ejecting the first ink drops to be printed to a predetermined region of the print medium for each of a plurality of relative movements of the print head by using a first mask pattern and generate second print data for ejecting the second ink drops to be printed to the predetermined region for each of the plurality of relative movements of the print head by using a second mask pattern; and a printing unit configured to print the image to the predetermined region based on the first and second print data generated by the generation unit, wherein the print permitted pixels of the first mask pattern are arranged non-periodically, and the print permitted pixels of the second mask pattern are arranged periodically.

4. The printing apparatus according to claim 3, wherein the arrangement pattern of print permitted pixels in the first mask pattern is a random pattern and the arrangement pattern of print permitted pixels in the second mask pattern is an interlace pattern, and in the interlaced pattern, print permitted pixels are consecutively arranged in the main-scanning direction and are not consecutively arranged in the sub-scanning direction.

5. An ink jet printing method, in which a print head provided with ejection ports that eject ink drops having a first size and that are arranged in a sub-scanning direction and ejection ports that eject ink drops having a second size larger than the first size and that are arranged in the sub-scanning direction is used, for performing printing an image by relative scanning of the print head and the print medium in a main-scanning direction crossing to the sub-scanning direction, comprising:
- a step that provides a printing unit configured to print the image to a predetermined region on the print medium by a plurality of scans of the print head; and
- a step for generating first print data for ejecting ink drops having the first size for each of the plurality of scans by using a first mask pattern and generating second print data for ejecting ink drops having the second size for each of the plurality of scans by using a second mask pattern,
- wherein a number of low frequency components of a spatial frequency characteristic shown by an arrangement of print permitted pixels in the second mask pattern is lower than a number of low frequency components of a spatial frequency characteristic shown by an arrangement of print permitted pixels in the first mask pattern.

6. An ink jet printing method that, during a relative movement of a print head in a main-scanning direction, which comprises a first ejection port array, in which a plurality of ejection ports that eject first ink drops are arranged in a sub-scanning direction, and a second ejection port array, in which a plurality of ejection ports that eject second ink drops having a second size larger than the first size are arranged in the sub-scanning direction, performs printing an image by ejecting the first ink drops and the second ink drops onto the print medium from the print head, comprising:
- a generation step for generating first print data for ejecting the first ink drops to be printed to a predetermined region of the print medium for each of a plurality of relative movements of the print head by using a first mask pattern and generating second print data for ejecting the second ink drops to be printed to the predetermined region for each of a plurality of relative movements of the print head by using a second mask pattern; and
- a printing step for printing the image to the predetermined region based on the first and second data generated at the generation step,
- wherein the print permitted pixels of the first mask pattern are arranged non-periodically, and
- the print permitted pixels of the second mask pattern are arranged periodically.

7. An ink jet printing apparatus, which uses a print head provided with ejection ports that eject ink drops having a first size and that are arranged in a sub-scanning direction, and ejection ports that eject ink drops having a second size larger than the first size and that are arranged in the sub-scanning direction, and performs printing an image by relative scanning of the print head and the print medium in a main-scanning direction crossing to the sub-scanning direction, comprising:
- a printing unit configured to print an image to a predetermined region on the print medium by a plurality of scans of the print head; and
- a generating unit configured to generate first print data for ejecting ink drops having the first size for each of the plurality of scans by using a first mask pattern and generate second print data for ejecting ink drops having the second size for each of the plurality of scans by using a second mask pattern,
- wherein the first mask pattern has a random pattern of print permitted pixels and the second mask pattern has an interlaced pattern of print permitted pixels, and in the interlaced pattern, dots are consecutively arranged in the main-scanning direction and not consecutively arranged in the sub-scanning direction.

* * * * *